US012603804B2

(12) United States Patent
Ferdinand et al.

(10) Patent No.: US 12,603,804 B2
(45) Date of Patent: Apr. 14, 2026

(54) SYSTEMS AND METHODS FOR SPECTRUM-CONTROLLED WAVEFORM MULTIPLEXING

(71) Applicant: Samsung Electronics Company, Ltd., Suwon si (KR)

(72) Inventors: Nuwan Suresh Ferdinand, Stittsville (CA); Joonyoung Cho, Portland, OR (US)

(73) Assignee: Samsung Electronics Company, Ltd., Suwon City (KR)

( * ) Notice: Subject to any disclaimer, the term of this patent is extended or adjusted under 35 U.S.C. 154(b) by 122 days.

(21) Appl. No.: 18/590,681

(22) Filed: Feb. 28, 2024

(65) Prior Publication Data

US 2025/0274324 A1      Aug. 28, 2025

(51) Int. Cl.
*H04L 27/26* (2006.01)

(52) U.S. Cl.
CPC ...... *H04L 27/2627* (2013.01); *H04L 27/2607* (2013.01); *H04L 27/26265* (2021.01)

(58) Field of Classification Search
CPC ............. H04L 27/2636; H04L 27/2607; H04L 27/26265
See application file for complete search history.

(56) References Cited

U.S. PATENT DOCUMENTS

2011/0135016 A1 * 6/2011 Ahn ..................... H04L 27/2614
375/259
2017/0117945 A1 4/2017 Kim
2022/0385512 A1 12/2022 Popovic

FOREIGN PATENT DOCUMENTS

| CN | 115712819 A | 2/2023 |
|---|---|---|
| CN | 117528756 A | 2/2024 |
| WO | WO 2022248033 A1 | 12/2022 |
| WO | WO 2023133024 A1 | 7/2023 |

OTHER PUBLICATIONS

Eerseghe, et al., "A Multicarrier Architecture Based Upon the Affine Fourier Transform", IEEE Transactions on Communications, vol. 53, No. 5, 10 pages. https://ieeexplore.ieee.org/document/1431130/ metrics#metrics, May 2005.
Bemani, et al., "Affine Frequency Division Multiplexing for Next Generation Wireless Communications", IEEE Transactions on Wireless Communications, 30 pages. arXiv:2204.12798v2 [cs.IT] May 3, 2022.
International search report and Written Opinion received for PCT Application No. PCT/KR2025/002683, 10 pages, May 28, 2025.

* cited by examiner

*Primary Examiner* — Rahel Guarino
(74) *Attorney, Agent, or Firm* — Baker Botts L.L.P.

(57) ABSTRACT

In one embodiment, a method includes accessing symbol sequences with each including multiple symbols, generating a respective frequency-domain signal for each of the symbol sequences based on a respective signal transformation algorithm that is based at least in part on a Fourier transform, mapping each of the frequency-domain signals to a respective subset of subcarriers out of all subcarriers in an allocated bandwidth, generating a waveform based on the frequency-domain signals and their respective subset of subcarriers based at least in part on an inverse Fourier transform, and transmitting the waveform to a second electronic device.

20 Claims, 6 Drawing Sheets

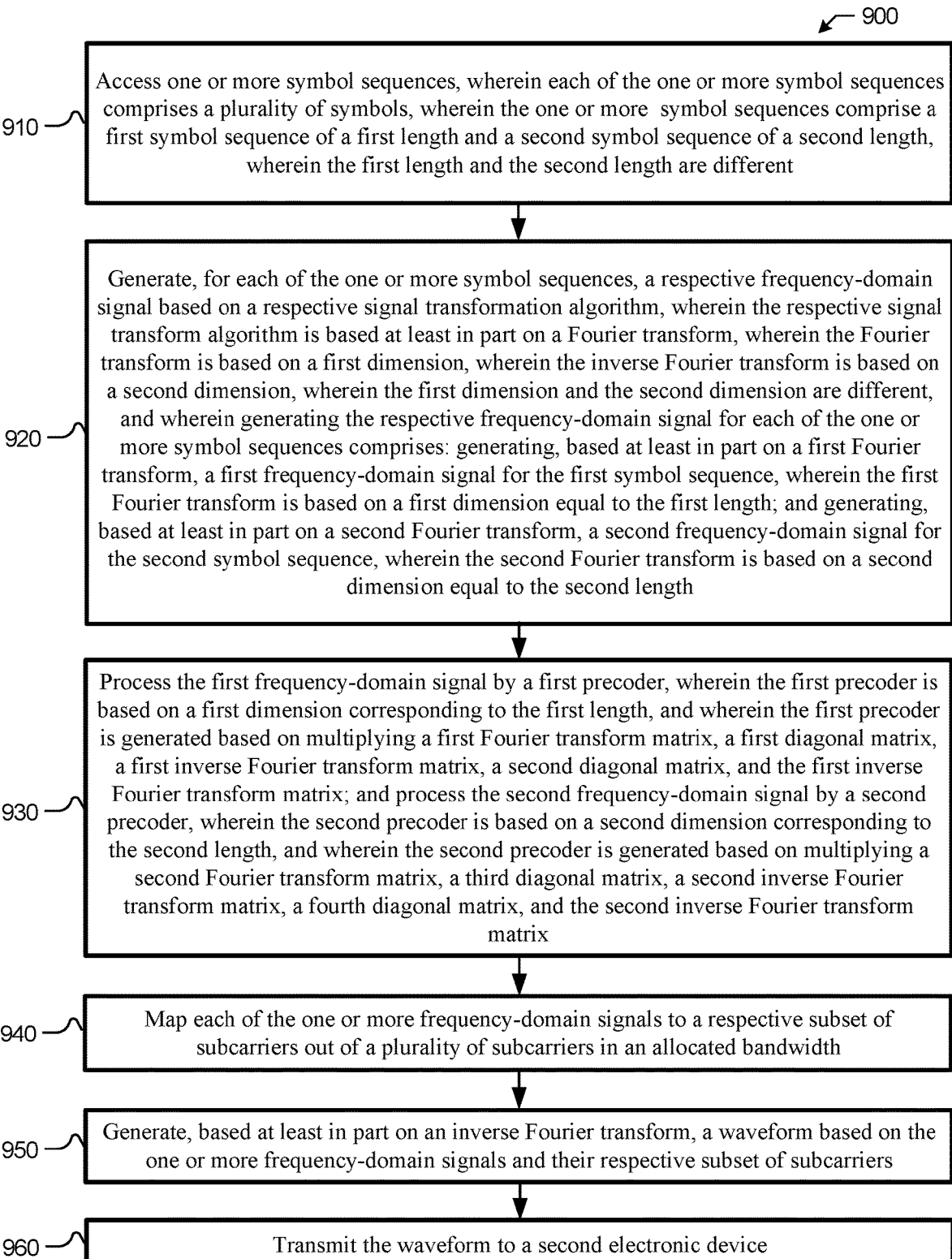

900

910 — Access one or more symbol sequences, wherein each of the one or more symbol sequences comprises a plurality of symbols, wherein the one or more symbol sequences comprise a first symbol sequence of a first length and a second symbol sequence of a second length, wherein the first length and the second length are different 920 — Generate, for each of the one or more symbol sequences, a respective frequency-domain signal based on a respective signal transformation algorithm, wherein the respective signal transform algorithm is based at least in part on a Fourier transform, wherein the Fourier transform is based on a first dimension, wherein the inverse Fourier transform is based on a second dimension, wherein the first dimension and the second dimension are different, and wherein generating the respective frequency-domain signal for each of the one or more symbol sequences comprises: generating, based at least in part on a first Fourier transform, a first frequency-domain signal for the first symbol sequence, wherein the first Fourier transform is based on a first dimension equal to the first length; and generating, based at least in part on a second Fourier transform, a second frequency-domain signal for the second symbol sequence, wherein the second Fourier transform is based on a second dimension equal to the second length 930 — Process the first frequency-domain signal by a first precoder, wherein the first precoder is based on a first dimension corresponding to the first length, and wherein the first precoder is generated based on multiplying a first Fourier transform matrix, a first diagonal matrix, a first inverse Fourier transform matrix, a second diagonal matrix, and the first inverse Fourier transform matrix; and process the second frequency-domain signal by a second precoder, wherein the second precoder is based on a second dimension corresponding to the second length, and wherein the second precoder is generated based on multiplying a second Fourier transform matrix, a third diagonal matrix, a second inverse Fourier transform matrix, a fourth diagonal matrix, and the second inverse Fourier transform matrix 940 — Map each of the one or more frequency-domain signals to a respective subset of subcarriers out of a plurality of subcarriers in an allocated bandwidth 950 — Generate, based at least in part on an inverse Fourier transform, a waveform based on the one or more frequency-domain signals and their respective subset of subcarriers 960 — Transmit the waveform to a second electronic device

COMPUTER SYSTEM

PROCESSOR — 1002

MEMORY — 1004

STORAGE — 1006

I/O INTERFACE — 1008

COMMUNICATION INTERFACE — 1010

SYSTEMS AND METHODS FOR SPECTRUM-CONTROLLED WAVEFORM MULTIPLEXING

TECHNICAL FIELD

This disclosure relates generally to wireless communications, and in particular relates to systems and methods for improving link-level performance in wireless communications.

BACKGROUND

High-mobility applications are one of the main focuses on future wireless standards. One such example includes high-speed trains. In such situations, the impact of Doppler frequency is significant for link-level performance. In particular, the current 5G NR waveform design relies on the fact that a channel remains the same during the symbol period, therefore, the channel can be modeled as linear time invariant (LTI). However, with the presence of high Doppler frequency, the channel varies within the symbol period. Therefore, the channel is no longer linear time invariant (LTI), and it is linear time variant (LTV).

In 5G NR, two waveforms can be used. One waveform is OFDM (orthogonal frequency division multiplexing), which is a multi-carrier waveform and primarily used in downlink channel and can also be used in uplink channel. The other waveform is DFT-s-OFDM, which uses DFT (discrete Fourier transform) to spread the signal in frequency to create a single carrier waveform. Both these waveforms use the LTI feature of the channel. In the presence of LTV channel, such as high-mobility applications, these two waveforms have significantly poor link-level performance.

BRIEF DESCRIPTION OF THE DRAWINGS

FIG. 9 illustrates is a flow diagram of a method for spectrum-controlled waveform multiplexing, in accordance with the presently disclosed embodiments.

DESCRIPTION OF EXAMPLE EMBODIMENTS

Spectrum-Controlled Waveform Multiplexing

Figures 1, 2, 3:
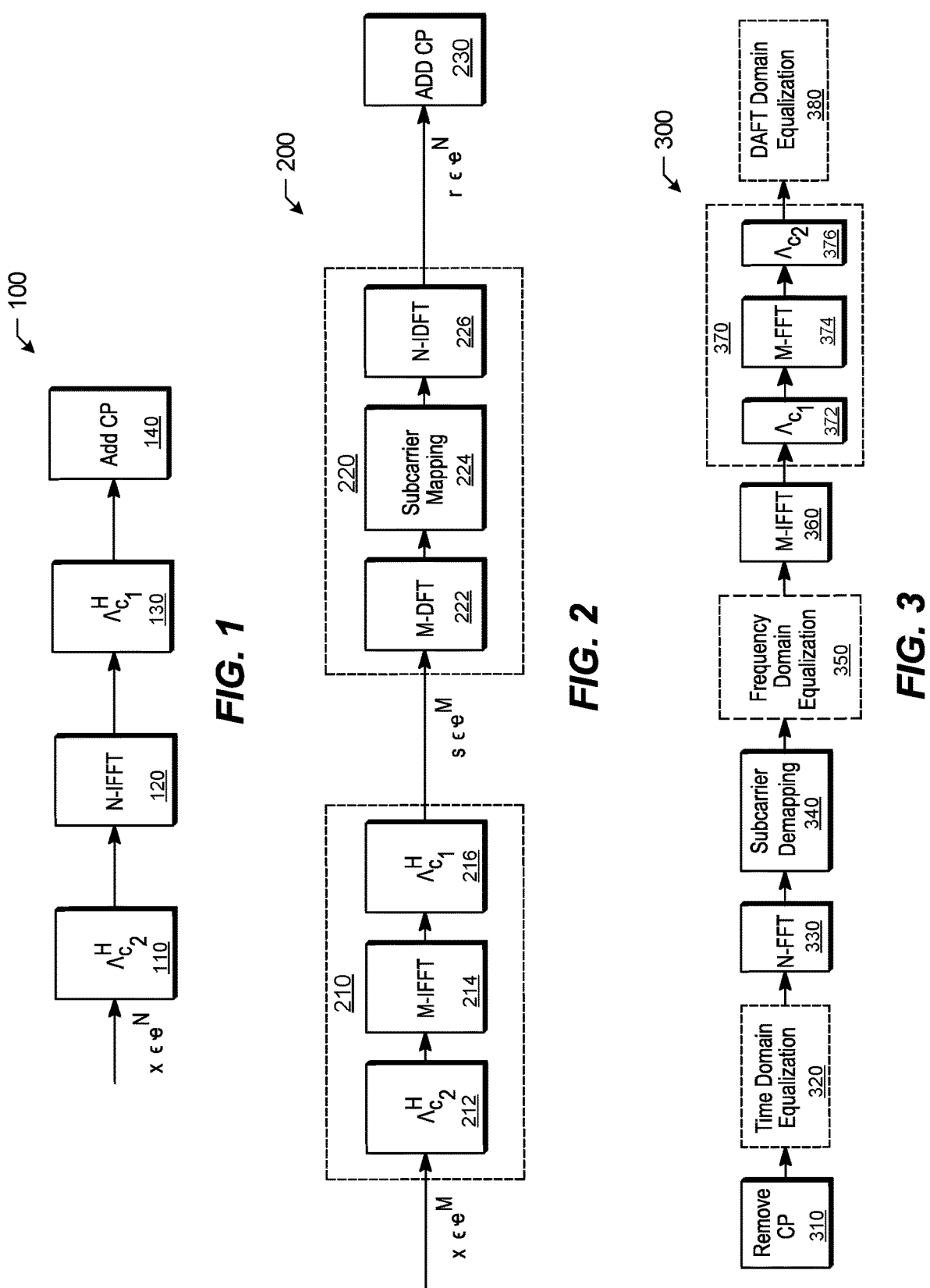
FIG. 1 illustrates an example block diagram for waveform generation using affine Fourier transform.
FIG. 2 illustrates an example block diagram for generating spectrum-controlled affine Fourier transformed based waveform by a transmitter.
FIG. 3 illustrates an example block diagram for processing spectrum-controlled affine Fourier transformed based waveform by a receiver.

In particular embodiments, a cellular system may generate a spectrum-controlled affine Fourier based waveform. The cellular system may control the occupying subcarriers in frequency. Therefore, the spectrum-controlled affine Fourier based waveform may occupy a certain sub-bandwidth (or a subset of subcarriers) of the entire bandwidth. As a result, the spectrum-controlled affine Fourier based waveform can be used to multiplex multiple streams similarly to OFDMA (orthogonal frequency-division multiple access) or DFT-s-OFDM. Furthermore, the spectrum-controlled affine Fourier based waveform may be multiplexed with other waveforms such as OFDM or DFT-s-OFDM without causing inter-channel inference (ICI). Although this disclosure describes generating particular waveforms by particular systems in a particular manner, this disclosure contemplates generating any suitable waveform by any suitable system in any suitable manner.

In particular embodiments, a first electronic device may access one or more symbol sequences. Each of the one or more symbol sequences may comprise a plurality of symbols. The first electronic device may then generate, for each of the one or more symbol sequences, a respective frequency-domain signal based on a respective signal transformation algorithm. As an example and not by way of limitation, the respective signal transform algorithm may be based at least in part on a Fourier transform. In particular embodiments, the first electronic device may map each of the one or more frequency-domain signals to a respective subset of subcarriers out of a plurality of subcarriers in an allocated bandwidth. The first electronic device may then generate, based at least in part on an inverse Fourier transform, a waveform based on the one or more frequency-domain signals and their respective subset of subcarriers. The first electronic device may further transmit the waveform to a second electronic device.

Certain technical challenges exist for generating a spectrum-controlled affine Fourier based waveform. One technical challenge may include effective spectrum control. The solution presented by the embodiments disclosed herein to address this challenge may be subcarrier mapping as the subcarrier mapping may enable different number of frequency subcarriers to be allocate within the same bandwidth for a frequency-domain signal. Another technical challenge may include multiplexing different waveform types. The solution presented by the embodiments disclosed herein to address this challenge may be processing distinct input sequences of symbols based their respective Fourier transform and precoders as each Fourier transform and precoder can be designed for a distinct waveform type.

Certain embodiments disclosed herein may provide one or more technical advantages. A technical advantage of the embodiments may include the flexibility to multiplex multiple user equipment within the same bandwidth as spectrum-controlled waveform may enable different number of frequency subcarriers to be allocate within the same bandwidth. Another technical advantage of the embodiments may include efficient usage of network resources as each waveform may occupy only a fraction of the entire bandwidth due to the ability to multiplex different waveform types within the same bandwidth. Another technical advantage of the embodiments may include reducing the implementation complexity as particular embodiments may fit into the same framework of DFT-s-OFDM. Another technical advantage of the embodiments may include better link performance for high-speed mobility scenarios as the spectrum-controlled affine based waveform is robust for Doppler frequency. Certain embodiments disclosed herein may provide none, some, or all of the above technical advantages. One or more other technical advantages may be readily apparent to one skilled in the art in view of the figures, descriptions, and claims of the present disclosure.

To reduce the impact of Doppler frequency, a few waveforms have been developed in conventional systems. One such approach is to use affine Fourier transform and optimize the parameters to reduce the impact of Doppler frequency, which may result in improved link-level performance. The basic concept of affine Fourier transform may be to spread the signal in both time and frequency. The affine Fourier transform based waveform may be implemented similarly to OFDM based inverse fast Fourier transform (IFFT) with few additional operations.

FIG. 1 illustrates an example block diagram 100 for waveform generation using affine Fourier transform. The x is the N length symbol vector. At block 110, the input symbol vector may be transformed by $$\Lambda_{c_2}^H.$$

At block 120, the output from block 110 may be transformed by N-point IFFT (N-IFFT). At block 130, the output from N-IFFT 120 may be transformed by $$\Lambda_{c_1}^H.$$

At block 140, cyclic prefix may be added.

The $\kappa_{c_1}$ and $\Lambda_{c_2}$ are diagonal matrices such that the $n^{th}$ diagonal elements is given by the $e^{-i2\pi c_1 n^2}$ and $e^{-i2\pi c_2 n^2}$ respectively, where $n \in \{1, 2, \dots, N\}$ and $c_1$ and $c_2$ are constants. One can see that when $c_1 = c_2 = 0$, the resultant waveform may be the same as OFDM. As a result, the embodiments disclosed herein may have a technical advantage of reducing the implementation complexity as particular embodiments may fit into the same framework of DFT-s-OFDM. It is possible to optimize the parameters $c_1$ and $c_2$ to minimize the impact of Doppler frequency.

While this waveform may be beneficial in dealing with Doppler frequency, the resultant waveform may occupy the entire bandwidth or all the subcarriers. This fact may make this waveform practically undesirable as one may need to have the flexibility of allocating subcarriers comprising the entire bandwidth and also have the ability to multiplex different types of waveforms, especially in multi-user access systems. For example, one may want to have the flexibility to multiplex multiple different waveforms such as affine Fourier based waveform and OFDM in the same bandwidth but localized in certain subcarriers.

To address the limitation of conventional approaches, the embodiments disclosed herein generate a spectrum-controlled affine Fourier based waveform. FIG. 2 illustrates an example block diagram 200 for generating spectrum-controlled affine Fourier transformed based waveform by a transmitter.

In particular embodiments, the one or more symbol sequences may comprise a first symbol sequence. The input x (e.g., the first symbol sequence) may be an M length vector of complex symbols in general. However, the input may be real or imaginary. As an example and not by way of limitation, these symbols may be generated from BPSK, π/2 BPSK, QPSK or QAM modulation.

Block 210 may indicate the affine Fourier transform. In particular embodiments, the first electronic device may generate, based on an affine Fourier transform, a first transformed symbol sequence for the first symbol sequence. The affine Fourier transform may include three main components. In the first block 212, the M length input symbols vector x may be multiplied by the diagonal matrix $$\Lambda_{c_2}^H$$

where $\kappa_{c_2}$ is a diagonal matrix with $m^{th}$ diagonal element being $e^{-i2\pi c_2 m^2}$ and the superscript $(.)^H$ denotes the Hermitian operation. Next the inverse discrete Fourier transform (DFT) is performed, which can be practically performed using M-point inverse fast Fourier transform (M-IFFT 214). The output of IFFT may be again multiplied by the diagonal matrix $$\Lambda_{c_1}^H$$

216 with $m^{th}$ diagonal element of $\Lambda_{c_1}$ being $e^{-i2\pi c_1 m^2}$.

The output from the affine Fourier transform 210 may be processed by spectrum controlling. The spectrum controlling block 220 may have three main components. In the first part 222, M-DFT may be performed on the output of the affine Fourier transform block 210. In particular embodiments, the Fourier transform (e.g., M-DFT 222) may be based on a first dimension (e.g., M). In particular embodiments, generating the frequency-domain signal for the first symbol sequence may be further based on the first transformed symbol sequence.

The output of M-DFT block 222 may be mapped to subcarriers in the next block 224 such that the M length sequence is mapped to M subcarriers out of total N subcarriers. Subcarrier mapping operation 224 may be performed using matrix operation where the output of the M-DFT block 222 M is multiplied by the subcarrier mapping matrix S where S is a N×M matrix. For each column $m \in \{1, 2, \dots, M\}$ of matrix S, there may be only one nonzero element, which is equal to one and located at row $n_m$ such that $n_m \neq n_m$ for $m \neq \overline{m}$. This way, the $m^{th}$ element of output of M-DFT 222 may be mapped to unique $n_m$ subcarrier. In some embodiments, the mapping may be circularly contiguous such that the mapped subcarrier indexes are L to $[L+M-1]_N$ where $L \in \{0,1,2, \dots, N-1\}$ and $[.]_N$ denotes the N modulo operation such that $[1+N]_N = 1$. The following operation may be the IDFT operation of size N (i.e., N-IDFT 226). Subcarrier mapping may be an effective solution for addressing the technical challenge of effective spectrum control as the subcarrier mapping may enable different number of frequency subcarriers to be allocate within the same bandwidth for a frequency-domain signal.

In particular embodiments, the inverse discrete Fourier transform (e.g., N-IDFT 226) may be based on a second dimension (e.g., N) and the first dimension and the second dimension may be different. Let x denote the M subcarrier indexes that are used in this block 226 such that $\chi \subset \{0,1, 2, \dots, N-1\}$ and $|\chi| = M$. The output of this block 226 is denoted by r, which is given by $$r = F_N^H S F_M \Lambda_{c_1}^H F_M^H \Lambda_{c_2}^H x \tag{1}$$

where the $F_M$ denotes the M×M Fourier transform matrix and $$F_M^H$$

is the M×M inverse Fourier transform matrix. Further, the matrix S denotes M×N subcarrier mapping matrix. Similarly, $$F_N^H$$

is the N×N inverse Fourier transform matrix.

$$\text{Let } \Psi = F_N^H S F_M \Lambda_{c_1}^H F_M^H \Lambda_{c_2}^H$$

be a N×M matrix. The following shows that $\Psi$ may form an orthonormal basis, i.e., $\Psi^H \Psi = I_M$ where $I_M$ is M× M identity matrix.

$$\Psi^H \Psi = \left( F_N^H S F_M \Lambda_{c_1}^H F_M^H \Lambda_{c_2}^H \right)^H \left( F_N^H S F_M \Lambda_{c_1}^H F_M^H \Lambda_{c_2}^H \right) \quad (2)$$

$$\Psi^H \Psi = \Lambda_{c_2} F_M \Lambda_{c_1} F_M^H S^H F_N \left( F_N^H S F_M \Lambda_{c_1}^H F_M^H \Lambda_{c_2}^H \right)$$

$$\Psi^H \Psi = \Lambda_{c_2} F_M \Lambda_{c_1} F_M^H S^H \left( F_N F_N^H \right) S F_M \Lambda_{c_1}^H F_M^H \Lambda_{c_2}^H.$$

Fourier transform matrix $F_N$ may be orthonormal. Thus, $$F_N F_N^H = I_N$$

where $I_N$ is a N×N identity matrix.

$$\Psi^H \Psi = \Lambda_{c_2} F_M \Lambda_{c_1} F_M^H \left( S^H S \right) F_M \Lambda_{c_1}^H F_M^H \Lambda_{c_2}^H. \quad (3)$$

By design $S^H S = I_M$. Therefore, $$\Psi^H \Psi = \Lambda_{c_2} F_M \Lambda_{c_1} \left( F_M^H F_M \right) \Lambda_{c_1}^H F_M^H \Lambda_{c_2}^H. \quad (4)$$

Fourier transform matrix $F_M$ may be orthonormal.

$$\text{Thus, } F_M^H F_M = I_M.$$

$$\Psi^H \Psi = \Lambda_{c_2} F_M \left( \Lambda_{c_1} \Lambda_{c_1}^H \right) F_M^H \Lambda_{c_2}^H. \quad (5)$$

By design, $$\Lambda_{c_1} \Lambda_{c_1}^H = I_M.$$

$$\Psi^H \Psi = \Lambda_{c_2} \left( F_M F_M^H \right) \Lambda_{c_2}^H \quad (6)$$

$$\Psi^H \Psi = \Lambda_{c_2} \Lambda_{c_2}^H = I_M.$$

The last step may be due to the fact that by design $$\Lambda_{c_2} \Lambda_{c_2}^H = I_M.$$

This may prove the orthonormal condition of $\Psi$.

In particular embodiments, the first electronic device may add a circular prefix to the waveform. At block 230, the transmitter may add circular prefix.

FIG. 3 illustrates an example block diagram 300 for processing spectrum-controlled affine Fourier transformed based waveform by a receiver. At block 310, the receiver may remove the circular prefix from the received signal to obtain N length sequence.

At block 320 which is optional, the receiver may perform time-domain channel equalization. In some embodiments, time-domain channel equalization may not be available in the case where frequency-domain equalization or discrete affine Fourier transform (DAFT) domain equalization is present.

At block 330, the receiver may perform the N-dimensional Fourier transform to obtain frequency-domain N-length sequence.

At block 340, the receiver may perform the subcarrier de-mapping operation. This operation may be opposite to the subcarrier mapping operation on the receiver side. The subcarrier de-mapping operation may select symbols that are present in the assigned M subcarriers. The selected subcarriers may be indexed by x. The subcarrier de-mapping operation may be performed by multiplying the input N-length vector by the subcarrier de-mapping M×N matrix $S^T$. For each row $m \in \{1, 2, \ldots, M\}$ of matrix $S^T$, there may be only one nonzero element, which is equal to one and located at $n_m$ such that $n_m \neq n_{\overline{m}}$ for $m \neq \overline{m}$. This way, the element in the $n_m$ subcarrier may be the output of the $m^{th}$ element.

At block 350 which is optional, the receiver may perform frequency-domain channel equalization. In some embodiments, frequency-domain channel equalization may not be available in the case where time-domain equalization or DAFT domain equalization is present.

At block 360, the receiver may perform M-dimensional IFFT on the output of M-length sequence of subcarrier de-mapping 340. Block 360 may output an M-length sequence.

At block 370, the receiver may perform affine frequency division multiplexing (AFDM) processing. Block 370 may comprise block 372, block 374, and block 376. At block 372, the M-length vector may be multiplied by the diagonal matrix $\Lambda_{c_1}$ where it is a diagonal matrix with $m^{th}$ diagonal element being $e^{-i2\pi c_1 m^2}$. Next, the M-dimensional FFT may be performed at block 374. At block 376, the output of M-FFT may be again multiplied by the diagonal matrix $\Lambda_{c_2}$ with $m^{th}$ diagonal element of $\Lambda_{c_2}$ being $e^{-i2\pi c_2 m^2}$.

At block 380 which is optional, the receiver may perform DAFT domain channel equalization. In some embodiments, DAFT domain channel equalization may not be available in the case where time-domain equalization or frequency-domain equalization is present.

In particular embodiments, based on the mathematical formulations disclosed below, a transmitter may perform an equivalent affine Fourier transform processing between the FFT and IFFT.

The output of the spectrum controlling block 220 in FIG. 2 may be written as $$r = F_N^H S F_M \Lambda_{c_1}^H F_M^H \Lambda_{c_2}^H x \qquad (7)$$

where the $F_M$ denotes the M×M Fourier transform matrix and $$F_M^H$$

is the M×M inverse Fourier transform matrix. Further, the matrix S denotes M×N subcarrier mapping matrix. Similarly, $$F_N^H$$

is the N×N inverse Fourier transform matrix. The $$\Lambda_{c_1}^H$$

and $$\Lambda_{c_2}^H$$

are Hermitian transpose of $\Lambda_{c_1}$ and $\Lambda_{c_2}$ diagonal matrices such that the $m^{th}$ diagonal elements of $\Lambda_{c_1}$ and $\Lambda_{c_2}$ are given by the $e^{-i2\pi c_1 m^2}$ and $e^{-i2\pi c_2 m^2}$ where $m \in \{1, 2, \ldots, M\}$ and $c_1$ and $c_2$ are constant parameters, which may be determined considering the target scenarios.

Fourier transform matrix $F_M$ may be orthonormal, thus $$F_M^H F_M = I_M$$

where $I_M$ is a M×M identity matrix. Therefore, the above equation (7) may be written as $$r = F_N^H S F_M \Lambda_{c_1}^H F_M^H \Lambda_{c_2}^H (F_M^H F_M) x. \qquad (8)$$

By matrix maneuvering $$r = F_N^H S \left[ F_M \Lambda_{c_1}^H F_M^H \Lambda_{c_2}^H F_M^H \right] F_M x \qquad (9)$$

$$r = F_N^H S \Phi F_M x$$

where $$\Phi = F_M (\Lambda_{c_1}^H F_M^H \Lambda_{c_2}^H) F_M^H,$$

an orthonormal basis as shown later in the receiver may be formed.

Figures 4, 5:
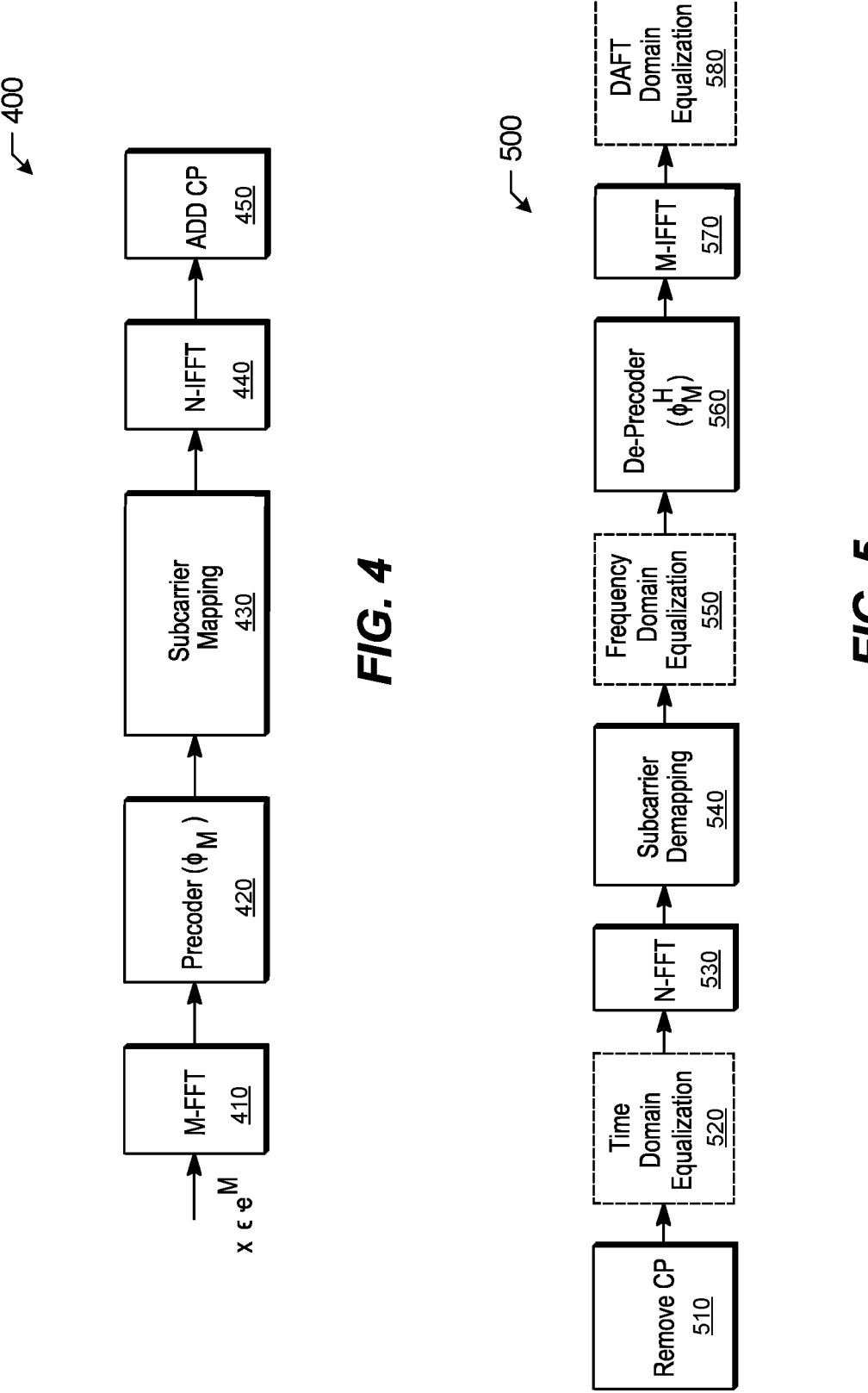
FIG. 4 illustrates an example block diagram for an alternative way of generating spectrum-controlled affine Fourier transformed based waveform by a transmitter.
FIG. 5 illustrates an example block diagram for processing the received signal using a low-complexity architecture.

FIG. 4 illustrates an example block diagram 400 for an alternative way of generating spectrum-controlled affine Fourier transformed based waveform by a transmitter. The input may include an M-length symbol vector comprising complex symbols in general. However, the symbols may be real or imaginary. As an example and not by way of limitation, these symbols may be generated from BPSK, $\pi/2$ BPSK, QPSK or QAM modulation.

At block 410, the input may be transformed into frequency domain using the DFT operation. As an example and not by way of limitation, the transformation may be performed using M size FFT.

In particular embodiments, the respective frequency-domain signal may comprise a first frequency-domain signal. The first electronic device may process the first frequency-domain signal by a precoder. In particular embodiments, the precoder may be generated based on multiplying a Fourier transform matrix, a first diagonal matrix, an inverse Fourier transform matrix, a second diagonal matrix, and the inverse Fourier transform matrix. At block 420, the M-length sequence in frequency domain may be multiplied by the matrix $\Phi$. The matrix $\Phi$ may be given by $$\Phi = F_M \left( \Lambda_{c_1}^H F_M^H \Lambda_{c_2}^H \right) F_M^H \qquad (10)$$

where $F_M$ denotes the M×M Fourier transform matrix and $$F_M^H$$

is the M×M inverse Fourier transform matrix. Further, $\Lambda_{c_1}$ and $\Lambda_{c_2}$ are diagonal matrices such that the $m^{th}$ diagonal elements are given by the $e^{-i2\pi c_1 m^2}$ and $e^{-i2\pi c_2 m^2}$ where $m \in \{1, 2, \ldots, M\}$ and parameters $c_1$ and $c_2$ are any real values, which may be determined considering the target scenarios. In particular embodiments, let the value of $c_1$ be $(1+\alpha)/N$ and $\alpha$ may be optimized for different applications. Based on the values of $c_1$ and $c_2$, $\Phi$ may have different structure. That is, $c_1$ and $c_2$ may be chosen to have a sparse structure of $\Phi$ for some applications. The output of this block 420 may be $\Phi F_M x$.

At block 430, the output of precoder block 420 may be mapped to subcarriers.

Subcarrier mapping operation may be performed using matrix operation where the output of the precoder block 420 is multiplied by the subcarrier mapping matrix S with S being an N×M matrix. For each column $m \in \{1, 2, \ldots M\}$ of matrix S, there may be only one nonzero element, which is equal to one, and located at $n_m$ such that $n_m \neq n_{\overline{m}}$ for $m \neq \overline{m}$. This way, the $m^{th}$ element of the precoder output may be mapped to a unique $n_m$ subcarrier. In some embodiments, the mapping may be circulatory contiguous such that the mapped subcarrier indexes are L to $[L+M-1]_N$ where $L \in \{0, 1, 2, \ldots N-1\}$ and $[.]_N$ denotes the N modulo operation such that $[l+N]_N = l$.

At block 440, the N-sized inverse Fourier transform may be performed. At block 450, the transmitter may add circular prefix.

Corresponding to the embodiments illustrated in FIG. 4, the receiver may process the received signal using a low-complexity architecture. First, the mathematical framework may be built to formulate the architecture.

The signal to demodulate may have the form $$r = F_N^H S\Phi F_M x \qquad (11)$$

where $$\Phi = F_M\left(\Lambda_{c_1}^H F_M^H \Lambda_{c_2}^H\right)F_M^H. \text{ As } F_N F^H = I_N,$$

$$F_N r = S\Phi F_M x. \qquad (12)$$

Further, by design $S^T S = I_M$, $$S^T F_N r = \Phi F_M x. \qquad (13)$$

Following proof shows $\Phi$ is an orthonormal basis, i.e., $\Phi^H \Phi = I_M$.

$$\Phi^H \Phi = \left(F_M \left(\Lambda_{c_1}^H F_M^H \Lambda_{c_2}^H\right) F_M^H\right)^H F_M \left(\Lambda_{c_1}^H F_M^H \Lambda_{c_2}^H\right) F_M^H \qquad (14)$$

$$\Phi^H \Phi = \left(F_M \left(\Lambda_{c_1}^H F_M^H \Lambda_{c_2}^H\right) F_M^H\right)^H F_M \left(\Lambda_{c_1}^H F_M^H \Lambda_{c_2}^H\right) F_M^H$$

$$\Phi^H \Phi = \left(F_M \left(\Lambda_{c_2} F_M \Lambda_{c_1}\right) F_M^H\right) F_M \left(\Lambda_{c_1}^H F_M^H \Lambda_{c_2}^H\right) F_M^H$$

$$\Phi^H \Phi = F_M \left(\Lambda_{c_2} F_M \Lambda_{c_1}\right)\left(F_M^H F_M\right)\left(\Lambda_{c_1}^H F_M^H \Lambda_{c_2}^H\right) F_M^H$$

$$\Phi^H \Phi = F_M \left(\Lambda_{c_2} F_M \left(\Lambda_{c_1} \Lambda_{c_1}^H\right) F_M^H \Lambda_{c_2}^H\right) F_M^H$$

$$\Phi^H \Phi = F_M \left(\Lambda_{c_2} \left(F_M F_M^H\right) \Lambda_{c_2}^H\right) F_M^H$$

$$\Phi^H \Phi = F_M \left(\Lambda_{c_2} \Lambda_{c_2}^H\right) F_M^H$$

$$\Phi^H \Phi = F_M F_M^H = I_M$$

Thus, $$\Phi_M^H S^T F_N r = F_M x. \qquad (15)$$

Taking M-IFFT, x may be obtained:

$$F_M^H \Phi_M^H S^T F_N r = x. \qquad (16)$$

Based on this mathematical formulation, a simplified receiver processing may be obtained. FIG. 5 illustrates an example block diagram 500 for processing the received signal using a low-complexity architecture.

At block 510, the circular prefix may be removed from the received signal to obtain N-length sequence. At block 520 which may be optional, the receiver may perform time-domain channel equalization. Block 520 may not be available in the case where frequency-domain equalization or DAFT domain equalization is present. At block 530, the N-dimensional Fourier transform may be performed to obtain N-length sequence in frequency domain.

At block 540, the subcarrier de-mapping operation may be performed. This operation may be opposite to the transmitter subcarrier mapping operation. In subcarrier de-mapping, the transmitter may select symbols that are present in the assigned M subcarriers. The selected subcarriers may be indexed by $\chi$. This operation may be performed by multiplying the input N-length vector by the subcarrier de-mapping M×N matrix $S^T$. For each row $m \in \{1, 2, \ldots M\}$ of matrix $S^T$, there may be only one nonzero element, which is equal to one, and located at $n_m$ such that $n_m \neq n_{\overline{m}}$ for $m \neq \overline{m}$. This way, the element in the $n_m$ subcarrier may be the output of the $m^{th}$ element.

At block 550 which may be optional, the receiver may perform frequency-domain channel equalization. Block 520 may not be available in the case where time-domain equalization or DAFT domain equalization is present.

Block 560 may be the receiver de-precoder block. In particular embodiments, the M-length sequence may be multiplied by the matrix $$\Phi_M^H.$$

The matrix $$\Phi_M^H$$

may be given by $$\Phi_M^H = F_M \left(\Lambda_{c_2} F_M \Lambda_{c_1}\right) F_M^H \qquad (17)$$

where $F_M$ denotes the M×M Fourier transform matrix and $$F_M^H$$

is the M×M inverse Fourier transform matrix. Further $\Lambda_{c_1}$ and $\Lambda_{c_2}$ are diagonal matrices such that the $m^{th}$ diagonal elements are given by the $e^{-i2\pi c_1 m^2}$ and $e^{-i2\pi c_2 m^2}$ where $m \in \{1, 2, \ldots, M\}$ and parameters $c_1$ and $c_2$ are any real values, which can be selected same as the transmitter.

At block 570, the receiver may perform M-dimensional IFFT on the output of the M-length sequence of subcarrier de-mapper. This operation may output an M-length sequence.

At block 580 which may be optional, the receiver may perform DAFT domain channel equalization. Block 580 may not be available in the case where time-domain equalization or frequency-domain equalization is present.

The embodiments disclosed herein may have a technical advantage of better link performance for high-speed mobility scenarios as the spectrum-controlled affine based waveform is robust for Doppler frequency.

In particular embodiments, a transmitter may multiplex different waveforms within the allocated bandwidth such that waveforms are allocated distinct subcarriers and are orthogonal to each other. In particular embodiments, the one or more symbol sequences may comprise a plurality of symbol sequences. Accordingly, the transmitter may process a plurality of frequency-domain signals corresponding to the plurality of symbol sequences by a plurality of precoders. In particular embodiments, one or more first precoders of the plurality of precoders may be based on a first precoder structure generated based on multiplying a Fourier transform matrix, a first diagonal matrix, a first inverse Fourier transform matrix, a second diagonal matrix, and a second inverse Fourier transform matrix. However, one or more second precoders of the plurality of precoders may be based on a second precoder structure different from the first precoder structure.

Figure 6:
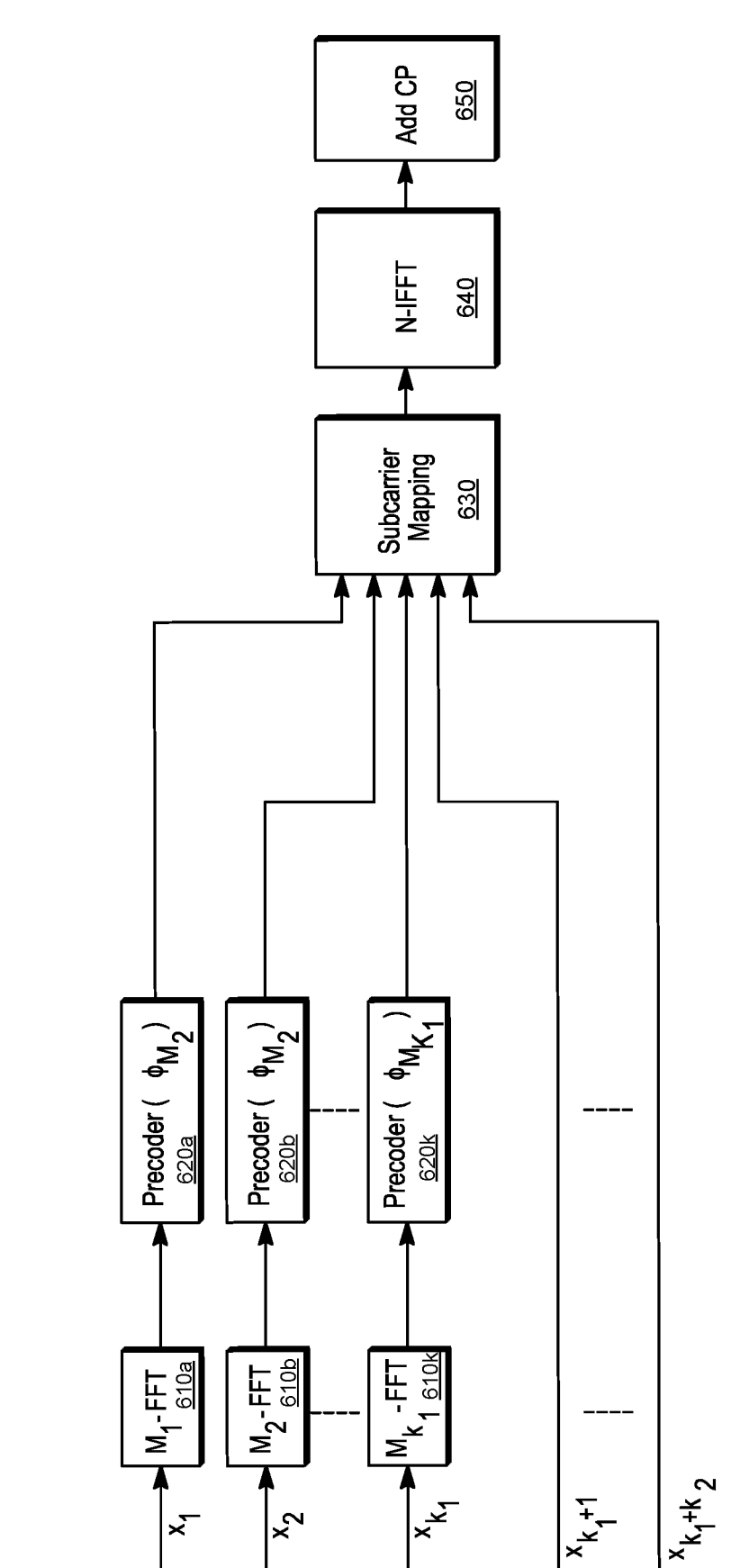
FIG. 6 illustrates an example block diagram for multiplexing different waveforms.

FIG. 6 illustrates an example block diagram 600 for multiplexing different waveforms. As illustrated in FIG. 6, there may be K=$k_1$+$k_2$ distinct input vectors and the k$^{th}$ input may be of length M$_k$. As an example and not by way of limitation, the one or more symbol sequences may comprise a first symbol sequence of a first length and a second symbol sequence of a second length. In particular embodiments, the first length and the second length may be different. These M$_k$∀k∈{1, K} length vectors may comprise complex symbols in general. However, the complex symbols may be real or imaginary. As an example and not by way of limitation, these symbols may be generated from BPSK, π/2 BPSK, QPSK or QAM modulations.

In particular embodiments, fractions of the input vectors may be pre-processed. Generating the respective frequency-domain signal for each of the one or more symbol sequences may comprise generating, based at least in part on a first Fourier transform, a first frequency-domain signal for the first symbol sequence. The first Fourier transform may be based on a first dimension equal to the first length. Generating the respective frequency-domain signal for each of the one or more symbol sequences may additionally comprise generating, based at least in part on a second Fourier transform, a second frequency-domain signal for the second symbol sequence. The second Fourier transform may be based on a second dimension equal to the second length. In particular embodiments, the first electronic device may process the first frequency-domain signal by a first precoder. The first precoder may be based on a first dimension corresponding to the first length. In addition, the first precoder may be generated based on multiplying a first Fourier transform matrix, a first diagonal matrix, a first inverse Fourier transform matrix, a second diagonal matrix, and the first inverse Fourier transform matrix. The first electronic device may also process the second frequency-domain signal by a second precoder. In particular embodiments, the second precoder may be based on a second dimension corresponding to the second length. The second precoder may be generated based on multiplying a second Fourier transform matrix, a third diagonal matrix, a second inverse Fourier transform matrix, a fourth diagonal matrix, and the second inverse Fourier transform matrix.

As an example and not by way of limitation, $k_1$ of the input vectors may be first transformed using FFT (e.g., M-FFT 610) and then multiplied by the precoder matrix 620. For example, the k$^{th}$ (∀k∈{1, 2, . . . , $k_1$}) vector of length M$_k$ may be transformed using M$_k$-size FFT 610k, then multiplied by the precoder matrix $\Phi_k$ 620k where it is given by $$\Phi_{M_k} = F_{M_k}\left(\Lambda_{c_{k1}}^H F_{M_k}^H \Lambda_{c_{k,2}}^H\right) F_{M_k}^H \tag{18}$$

where the $F_{M_k}$ denotes the M$_k$×M$_k$ Fourier transform matrix and $$F_{M_k}^H$$

is the M$_k$×M$_k$ inverse Fourier transform matrix. Further, $\Lambda_{c_{k,1}}$ and $\Lambda_{c_{k,2}}$ are diagonal matrices such that the n$^{th}$ diagonal elements are given by the $e^{-i2\pi c_{k,1}m^2}$ and $e^{-i2\pi c_{k,2}m^2}$ where m∈{1, 2, . . . , M$_k$} and $c_{k,1}$ and $c_{k,2}$ are constant parameters, which can be determined considering the target scenarios. Alternatively, the $\Phi_{M_k}$ matrix can be a diagonal matrix or identity matrix. In a different embodiment, the precoding step may not be present. Processing distinct input sequences of symbols based their respective Fourier transform and precoders may be an effective solution for addressing the technical challenge of multiplexing different waveform types as each Fourier transform and precoder can be designed for a distinct waveform type.

In subcarrier mapping block 630, the pre-processed $k_1$ streams and $k_2$ input streams may be mapped to subcarriers. To perform this task, the following condition may need to be satisfied:

$$\sum_{k}^{K} M_k \le N. \tag{19}$$

Then the k$^{th}$ input may be mapped to M$_k$ subcarriers out of the total N subcarriers such that two inputs do not overlap, and therefore, the orthogonality condition may be satisfied. The subcarriers may be mapped contiguously such that the k$^{th}$ input is mapped to subcarriers of indexes L$_k$ to [L$_k$+ M$_k$−1]$_N$ where L$_k$ ∈ {0,1,2, . . . . N−1} and [.] N denotes the N modulo operation such that [l+N]$_N$=l.

At block 640, the N-size inverse Fourier transform may be performed. At block 650, the transmitter may add circular prefix.

As can be seen, a technical advantage of the embodiments may include the flexibility to multiplex multiple user equipment within the same bandwidth as spectrum-controlled waveform may enable different number of frequency subcarriers to be allocate within the same bandwidth. In addition, the embodiments disclosed herein may have another technical advantage of efficient usage of network resources as each waveform may occupy only a fraction of the entire bandwidth due to the ability to multiplex different waveform types within the same bandwidth.

In particular embodiments, some parameters may be communicated between the transmitter and the receiver. As an example and not by way of limitation, the allocated bandwidth, which is typically defined by the number of subcarriers M$_k$, may be required for the transmitter and the receiver. As another example and not by way of limitation, the subcarrier starting index L$_k$ and IFFT size N may be required for the transmitter and the receiver. These parameters may be signaled between the transmitter and the receiver. In the downlink case, the transmitter may be the base station (BS) and the receiver may be the user equipment (UE). In the uplink case, the receiver may be the base station (BS) and the transmitter may be the user equipment (UE). As yet another example and not by way of limitation, the waveform choice may be communicated between the transmitter and the receiver. Depending on the application (e.g., high Doppler), one waveform over the other may be selected. Multiple different waveforms may be specified. Through the signaling procedure, one waveform may be selected.

For affine Fourier based waveform disclosed herein, the precoder function $\Phi_{M_k}$ and the relevant affine Fourier transform parameters $c_{k,1}$ and $c_{k,1}$ may be communicated between the transmitter and the receiver. Then through signaling, one set may be selected based on the application. As an example and not by way of limitation, it is possible that two or four different precoder matrices may be specified. Then through signaling (using one or two bits), one precoder matrix may be selected as $\Phi_{M_k}$. Alternatively, it is possible that two or four or higher combination pairs of values may be specified for $c_{k,1}$ and $c_{k,2}$, which may create a table lookup where each combination is mapped to a bit pattern. For example, four different combinations can be mapped to two bits. The present disclosure denotes this mapping as $f(c_{k,1}, c_{k,2})$ and $f(\Phi_{M_k})$. Alternatively, there may not be such a mapping and $f(c_{k,1}, c_{k,1})$ may represent the values of $c_{k,1}$ and $c_{k,2}$.

Figures 7, 8:
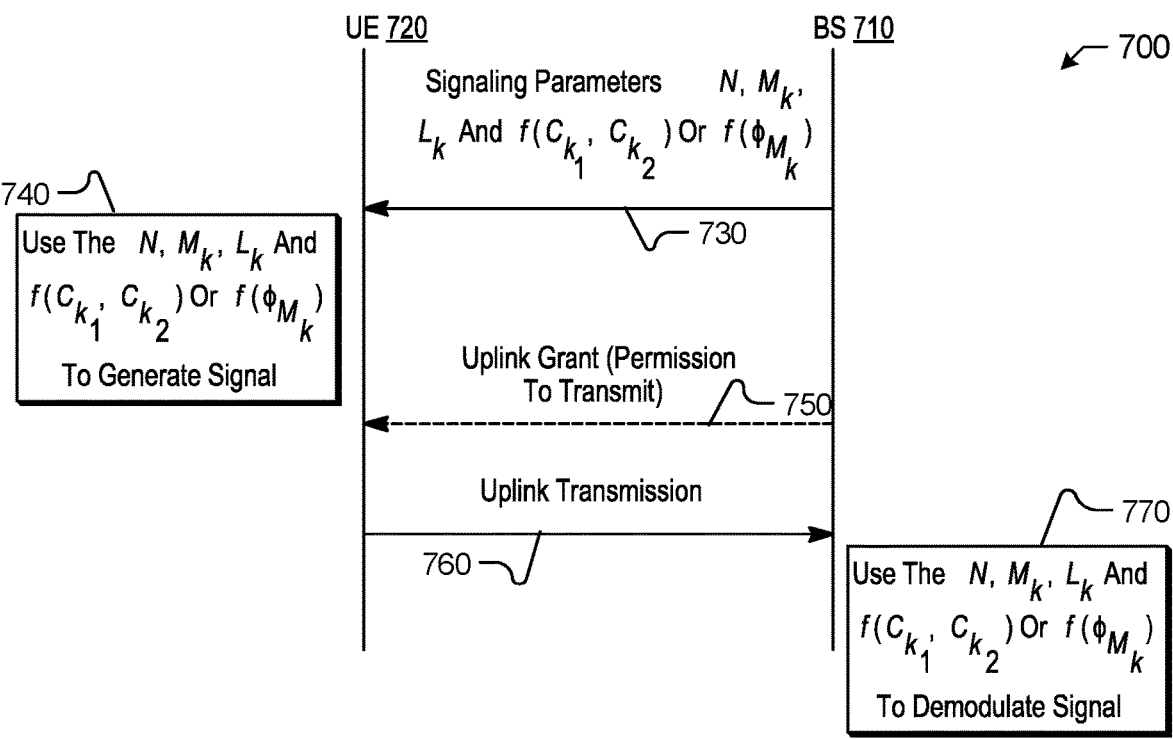
FIG. 7 illustrates an example signaling diagram for an uplink transmission.
FIG. 8 illustrates an example signaling diagram for a downlink transmission.

FIG. 7 illustrates an example signaling diagram 700 for an uplink transmission. In particular embodiments, all or a part of the signaling procedure as illustrated in FIG. 7 may be employed for the uplink transmission. In this scenario, the first electronic device may be a user equipment and the second electronic device may be a base station. The first electronic device may receive, at the first electronic device from the second electronic device, a plurality of parameters via a signaling channel. As an example and not by way of limitation, the plurality of parameters comprise one or more of a dimension of the inverse Fourier transform, a number of the plurality of subcarriers, a respective starting index of the respective subset of subcarriers, a parameter associated with an affine Fourier transform, or a precoder function. In particular embodiments, the waveform may be generated further based on the plurality of parameters. At step 730, the base station (BS) 710 may signal parameters N, M, $L_k$, and $f(c_{k,1}, c_{k,1})$ or $f(\Phi_{M_k})$ to the user equipment (UE) 720. At step 740, the user equipment 720 may use N, M, $L_k$, and $f(c_{k,1}, c_{k,1})$ or $f(\Phi_{M_k})$ to generate signal. At an optional step 750, the base station 710 may send uplink grant (permission to transmit) to the user equipment 720. At step 760, the user equipment 720 may send the uplink transmission to the base station 710. At step 770, the base station 710 may use N, M, $L_k$, and $f(c_{k,1}, c_{k,1})$ or $f(\Phi_{M_k})$ to demodulate signal.

FIG. 8 illustrates an example signaling diagram 800 for a downlink transmission. In this scenario, the first electronic device may be a base station and the second electronic device may be a user equipment. In particular embodiments, generating the waveform may be further based on a plurality of parameters comprising one or more of a dimension of the inverse Fourier transform, a number of the plurality of subcarriers, a respective starting index of the respective subset of subcarriers, a parameter associated with an affine Fourier transform, or a precoder function. The first electronic device may transmit, from the first electronic device to the second electronic device, the plurality of parameters via a signaling channel. At step 830, the base station (BS) 810 may signal parameters N, M, $L_k$, and $f(c_{k,1}, c_{k,1})$ or $f(\Phi_{M_k})$ to the user equipment (UE) 820. At step 840, the base station 810 may use N, M, $L_k$, and $f(c_{k,1}, c_{k,1})$ or $f(\Phi_{M_k})$ to generate signal. At step 850, the base station 810 may send the downlink transmission to the user equipment 820. At step 860, the user equipment 820 may use N, M, $L_k$, and $f(c_{k,1}, c_{k,1})$ or $f(\Phi_{M_k})$ to demodulate signal.

FIG. 9 illustrates is a flow diagram of a method 900 for spectrum-controlled waveform multiplexing, in accordance with the presently disclosed embodiments. The method 900 may be performed utilizing one or more processing devices (e.g., a first wireless endpoint device) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing wireless communication data, software (e.g., instructions running/executing on one or more processors), firmware (e.g., microcode), or some combination thereof.

The method 900 may begin at step 910 with the one or more processing devices (e.g., the first electronic device). For example, in particular embodiments, the first electronic device may access one or more symbol sequences, wherein each of the one or more symbol sequences comprises a plurality of symbols, wherein the one or more symbol sequences comprise a first symbol sequence of a first length and a second symbol sequence of a second length, wherein the first length and the second length are different. The method 900 may then continue at step 920 with the one or more processing devices (e.g., the first electronic device). For example, in particular embodiments, the first electronic device may generate, for each of the one or more symbol sequences, a respective frequency-domain signal based on a respective signal transformation algorithm, wherein the respective signal transform algorithm is based at least in part on a Fourier transform, wherein the Fourier transform is based on a first dimension, wherein the inverse Fourier transform is based on a second dimension, wherein the first dimension and the second dimension are different, and wherein generating the respective frequency-domain signal for each of the one or more symbol sequences comprises: generating, based at least in part on a first Fourier transform, a first frequency-domain signal for the first symbol sequence, wherein the first Fourier transform is based on a first dimension equal to the first length; and generating, based at least in part on a second Fourier transform, a second frequency-domain signal for the second symbol sequence, wherein the second Fourier transform is based on a second dimension equal to the second length. The method 900 may then continue at step 930 with the one or more processing devices (e.g., the first electronic device). For example, in particular embodiments, the first electronic device may process the first frequency-domain signal by a first precoder, wherein the first precoder is based on a first dimension corresponding to the first length, and wherein the first precoder is generated based on multiplying a first Fourier transform matrix, a first diagonal matrix, a first inverse Fourier transform matrix, a second diagonal matrix, and the first inverse Fourier transform matrix; and process the second frequency-domain signal by a second precoder, wherein the second precoder is based on a second dimension corresponding to the second length, and wherein the second precoder is generated based on multiplying a second Fourier transform matrix, a third diagonal matrix, a second inverse Fourier transform matrix, a fourth diagonal matrix, and the second inverse Fourier transform matrix. The method 900 may then continue at step 940 with the one or more processing devices (e.g., the first electronic device). For example, in particular embodiments, the first electronic device may map each of the one or more frequency-domain signals to a respective subset of subcarriers out of a plurality of subcarriers in an allocated bandwidth. The method 900 may then continue at step 950 with the one or more processing devices (e.g., the first electronic device). For example, in particular embodiments, the first electronic device may generate, based at least in part on an inverse Fourier transform, a waveform based on the one or more frequency-domain signals and their respective subset of subcarriers. The method 900 may then continue at step 960 with the one or more processing devices (e.g., the first electronic device). For example, in particular embodiments, the first electronic device may transmit the waveform to a second electronic device. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for spectrum-controlled waveform multiplexing including the particular steps of the method of FIG. 9, this disclosure contemplates any suitable method for spectrum-controlled waveform multiplexing including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Systems and Methods

Figure 10:
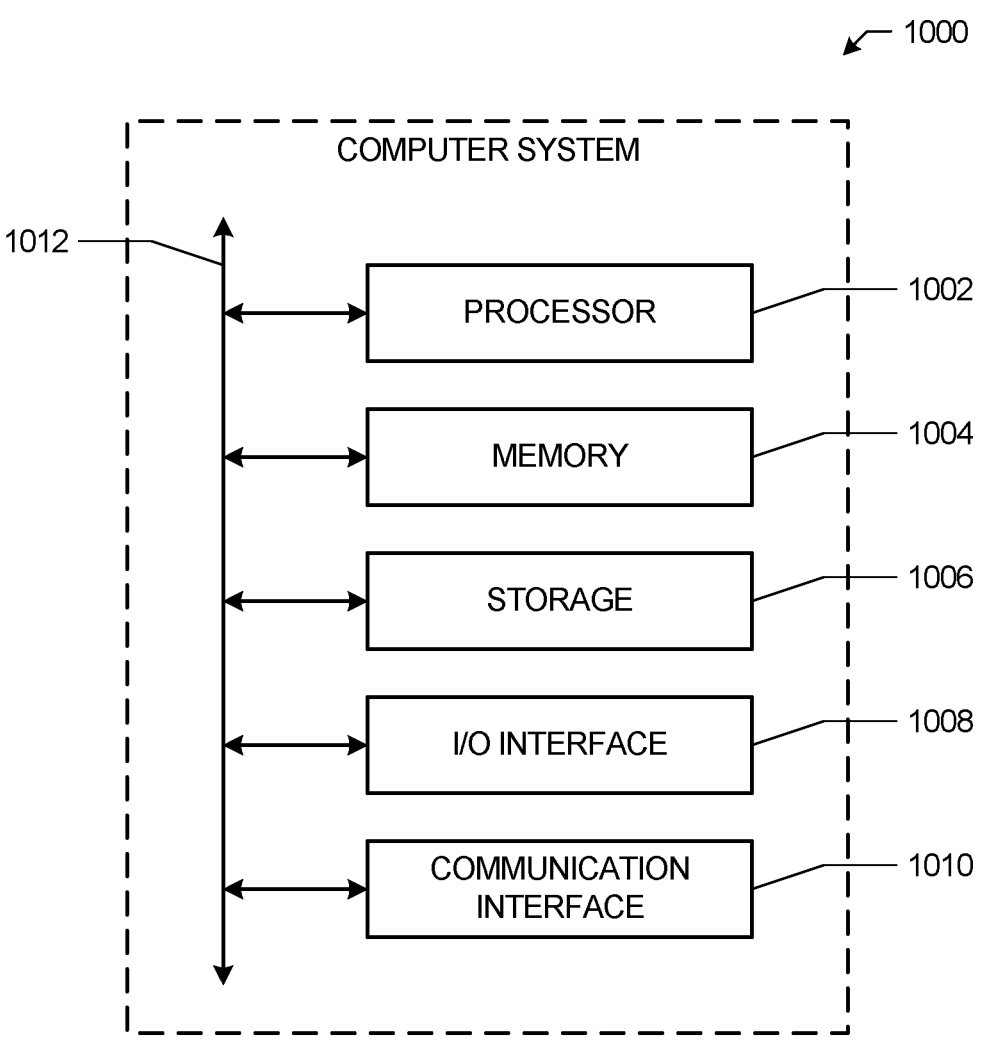
FIG. 10 illustrates an example computer system that may be utilized for spectrum-controlled waveform multiplexing, in accordance with the presently disclosed embodiments.

FIG. 10 illustrates an example computer system 1000 that may be utilized for spectrum-controlled waveform multiplexing, in accordance with the presently disclosed embodiments. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks.

Where appropriate, one or more computer systems 1000 may perform without substantial spatial or temporal limitation one or more steps of one or more methods described or illustrated herein. As an example, and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement. In particular embodiments, processor 1002 includes hardware for executing instructions, such as those making up a computer program. As an example, and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example, and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002.

Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example, and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere).

One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memory devices, where appropriate. Although this disclosure describes and illustrates particular memory, this disclosure contemplates any suitable memory.

In particular embodiments, storage 1006 includes mass storage for data or instructions. As an example, and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it.

As an example, and not by way of limitation, computer system 1000 may communicate with an ad hoc network, a personal area network (PAN), a local area network (LAN), a wide area network (WAN), a metropolitan area network (MAN), an ultra-wideband network (UWB), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example, and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a first electronic device:
accessing one or more symbol sequences, wherein each of the one or more symbol sequences comprises a plurality of symbols;
generating, for each of the one or more symbol sequences, a respective frequency-domain signal based on a respective signal transformation algorithm, wherein the respective signal transform algorithm is based at least in part on a Fourier transform;
mapping each of the one or more frequency-domain signals to a respective subset of subcarriers out of a plurality of subcarriers in an allocated bandwidth;
generating, based at least in part on an inverse Fourier transform, a waveform based on the one or more frequency-domain signals and their respective subset of subcarriers; and
transmitting the waveform to a second electronic device.

2. The method of claim 1, wherein the one or more symbol sequences comprise a first symbol sequence, wherein the respective frequency-domain signal for each of the one or more symbol sequences comprises a first frequency-domain signal for the first symbol sequence, wherein the method further comprises:
generating, based on an affine Fourier transform, a first transformed symbol sequence for the first symbol sequence, wherein generating the first frequency-domain signal for the first symbol sequence is further based on the first transformed symbol sequence.

3. The method of claim 1, wherein the Fourier transform is based on a first dimension, wherein the inverse Fourier transform is based on a second dimension, and wherein the first dimension and the second dimension are different.

4. The method of claim 1, further comprising:
adding a circular prefix to the waveform.

5. The method of claim 1, wherein the respective frequency-domain signal comprises a first frequency-domain signal, wherein the method further comprises:
processing the first frequency-domain signal by a precoder.

6. The method of claim 5, wherein the precoder is generated based on multiplying a Fourier transform matrix, a first diagonal matrix, an inverse Fourier transform matrix, a second diagonal matrix, and the inverse Fourier transform matrix.

7. The method of claim 1, wherein the one or more symbol sequences comprise a first symbol sequence of a first length and a second symbol sequence of a second length.

8. The method of claim 7, wherein the first length and the second length are different.

9. The method of claim 7, wherein generating the respective frequency-domain signal for each of the one or more symbol sequences comprises:
generating, based at least in part on a first Fourier transform, a first frequency-domain signal for the first symbol sequence, wherein the first Fourier transform is based on a first dimension equal to the first length; and
generating, based at least in part on a second Fourier transform, a second frequency-domain signal for the second symbol sequence, wherein the second Fourier transform is based on a second dimension equal to the second length.

10. The method of claim 9, further comprising:
processing the first frequency-domain signal by a first precoder, wherein the first precoder is based on a first dimension corresponding to the first length, and wherein the first precoder is generated based on multiplying a first Fourier transform matrix, a first diagonal matrix, a first inverse Fourier transform matrix, a second diagonal matrix, and the first inverse Fourier transform matrix; and
processing the second frequency-domain signal by a second precoder, wherein the second precoder is based on a second dimension corresponding to the second length, and wherein the second precoder is generated based on multiplying a second Fourier transform matrix, a third diagonal matrix, a second inverse Fourier transform matrix, a fourth diagonal matrix, and the second inverse Fourier transform matrix.

11. The method of claim 1, wherein the one or more symbol sequences comprise a plurality of symbol sequences, wherein the method further comprises:

processing a plurality of frequency-domain signals corresponding to the plurality of symbol sequences by a plurality of precoders, wherein one or more first precoders of the plurality of precoders are based on a first precoder structure generated based on multiplying a Fourier transform matrix, a first diagonal matrix, a first inverse Fourier transform matrix, a second diagonal matrix, and a second inverse Fourier transform matrix, and wherein one or more second precoders of the plurality of precoders are based on a second precoder structure different from the first precoder structure.

12. The method of claim 1, further comprising:

receiving, at the first electronic device from the second electronic device, a plurality of parameters via a signaling channel, wherein the plurality of parameters comprise one or more of a dimension of the inverse Fourier transform, a number of the plurality of subcarriers, a respective starting index of the respective subset of subcarriers, a parameter associated with an affine Fourier transform, or a precoder function, and wherein the waveform is generated further based on the plurality of parameters.

13. The method of claim 1, wherein generating the waveform is further based on a plurality of parameters comprising one or more of a dimension of the inverse Fourier transform, a number of the plurality of subcarriers, a respective starting index of the respective subset of subcarriers, a parameter associated with an affine Fourier transform, or a precoder function, and wherein the method further comprises:

transmitting, from the first electronic device to the second electronic device, the plurality of parameters via a signaling channel.

14. A first electronic device comprising:

one or more non-transitory computer-readable storage media including instructions; and one or more processors coupled to the storage media, the one or more processors configured to execute the instructions to:

access one or more symbol sequences, wherein each of the one or more symbol sequences comprises a plurality of symbols;

generate, for each of the one or more symbol sequences, a respective frequency-domain signal based on a respective signal transformation algorithm, wherein the respective signal transform algorithm is based at least in part on a Fourier transform;

map each of the one or more frequency-domain signals to a respective subset of subcarriers out of a plurality of subcarriers in an allocated bandwidth;

generate, based at least in part on an inverse Fourier transform, a waveform based on the one or more frequency-domain signals and their respective subset of subcarriers; and transmit the waveform to a second electronic device.

15. The first electronic device of claim 14, wherein the one or more symbol sequences comprise a first symbol sequence, wherein the respective frequency-domain signal for each of the one or more symbol sequences comprises a first frequency-domain signal for the first symbol sequence, wherein the one or more processors are further configured to execute the instructions to:

generate, based on an affine Fourier transform, a first transformed symbol sequence for the first symbol sequence, wherein generating the first frequency-domain signal for the first symbol sequence is further based on the first transformed symbol sequence.

16. The first electronic device of claim 14, wherein the Fourier transform is based on a first dimension, wherein the inverse Fourier transform is based on a second dimension, and wherein the first dimension and the second dimension are different.

17. The first electronic device of claim 14, wherein the one or more processors are further configured to execute the instructions to:

add a circular prefix to the waveform.

18. The first electronic device of claim 14, wherein the one or more symbol sequences comprise a plurality of symbol sequences, wherein the one or more processors are further configured to execute the instructions to:

process a plurality of frequency-domain signals corresponding to the plurality of symbol sequences by a plurality of precoders, wherein one or more first precoders of the plurality of precoders are based on a first precoder structure generated based on multiplying a Fourier transform matrix, a first diagonal matrix, a first inverse Fourier transform matrix, a second diagonal matrix, and a second inverse Fourier transform matrix, and wherein one or more second precoders of the plurality of precoders are based on a second precoder structure different from the first precoder structure.

19. A non-transitory computer-readable storage media comprising instructions executable by a processor to:

access, by a first electronic device, one or more symbol sequences, wherein each of the one or more symbol sequences comprises a plurality of symbols;

generate, by the first electronic device for each of the one or more symbol sequences, a respective frequency-domain signal based on a respective signal transformation algorithm, wherein the respective signal transform algorithm is based at least in part on a Fourier transform;

map, by the first electronic device, each of the one or more frequency-domain signals to a respective subset of subcarriers out of a plurality of subcarriers in an allocated bandwidth;

generate, by the first electronic device based at least in part on an inverse Fourier transform, a waveform based on the one or more frequency-domain signals and their respective subset of subcarriers; and transmit, from the first electronic device, the waveform to a second electronic device.

20. The media of claim 19, wherein the one or more symbol sequences comprise a first symbol sequence, wherein the respective frequency-domain signal for each of the one or more symbol sequences comprises a first frequency-domain signal for the first symbol sequence, the non-transitory computer-readable media further comprising instructions executable by the processor to:

generate, based on an affine Fourier transform, a first transformed symbol sequence for the first symbol sequence, wherein generating the first frequency-domain signal for the first symbol sequence is further based on the first transformed symbol sequence.

* * * * *